(12) United States Patent
Herman

(10) Patent No.: US 8,991,790 B2
(45) Date of Patent: Mar. 31, 2015

(54) MULTIPLE ACTION HOIST

(71) Applicant: Andrew Herman, Olney, IL (US)

(72) Inventor: Andrew Herman, Olney, IL (US)

( * ) Notice: Subject to any disclaimer, the term of this patent is extended or adjusted under 35 U.S.C. 154(b) by 296 days.

(21) Appl. No.: 13/756,794

(22) Filed: Feb. 1, 2013

(65) Prior Publication Data

US 2013/0200317 A1   Aug. 8, 2013

Related U.S. Application Data

(60) Provisional application No. 61/593,929, filed on Feb. 2, 2012.

(51) Int. Cl.
*H02G 1/08*   (2006.01)
*H02G 1/02*   (2006.01)

(52) U.S. Cl.
CPC .................................. *H02G 1/02* (2013.01)
USPC ........................... 254/134.3 R; 254/134.3 CL

(58) Field of Classification Search
CPC ............ B66F 19/00; H02G 1/08; H02G 7/00; H02G 7/04
USPC ........ 254/134.3 R, 134.3 SC, 134 CL, 134.6, 254/134.3 FT
See application file for complete search history.

(56) References Cited

U.S. PATENT DOCUMENTS

| | | | | |
|---|---|---|---|---|
| 2,913,224 | A | * | 11/1959 | Uhlig .............................. 254/369 |
| 3,648,978 | A | * | 3/1972 | Ratcliff .......................... 254/376 |
| 3,881,361 | A | * | 5/1975 | Newell .......................... 254/369 |
| D315,976 | S | * | 4/1991 | Shieh ............................. D34/33 |
| 5,524,869 | A | * | 6/1996 | Asplin ................. 254/134.3 CL |
| 7,874,543 | B2 | * | 1/2011 | Theisen ................. 254/134.3 R |
| 2003/0189195 | A1 | * | 10/2003 | Delaney et al. ...... 254/134.3 CL |
| 2009/0127529 | A1 | * | 5/2009 | Ruan ............................. 254/369 |

* cited by examiner

*Primary Examiner* — Lee D Wilson
*Assistant Examiner* — Jordan Stolle
(74) *Attorney, Agent, or Firm* — Leydig, Voit & Mayer, Ltd.

(57) ABSTRACT

A method and apparatus for transferring the ends of power lines between first and second supports including a frame having a pair of independently operable hoist mechanisms which each include a tension line with an attachment element at the end thereof, with the drums being rotatable by respective ratchet mechanisms for enabling the transfer of the end of a tension line from one support location to a different support location.

11 Claims, 12 Drawing Sheets

MULTIPLE ACTION HOIST

CROSS-REFERENCE TO RELATED APPLICATION

This patent application claims the benefit of U.S. Provisional Patent Application No. 61/593,929 filed Feb. 2, 2012, which is incorporated by reference.

FIELD OF THE INVENTION

The present invention relates generally to hoists which have particular utility in the transfer of ends of power lines between support posts, and more particularly, to an apparatus and method for transferring the ends of power lines from one support post to a different nearby support post or location of support.

BACKGROUND OF THE INVENTION

Power lines are supported in the field by support posts, or cross arms of such support posts, at elevations of 60 feet or more above the ground. It often is necessary to transfer the ends of such power lines from one support post to another due to damage, aging, or rotting of the post material. This commonly is done by hand operated hoists operated by linemen positioned at the elevation of the power line. Typically one hoist is used whereby a hook on the end of a retractable tensioning line of the hoist, such as a strap, chain, or the like, is hooked to an eyelet of a dead end connector of the power line, and an eyelet of the hoist is coupled to a first wire clamp that is secured to the power line. The retractable tensioning line of a second hoist is connected to a newly-installed dead end connector mounted on the new support post and an eyelet of the second hoist is connected to a second wire grip mounted on the power line to be transferred. Cranking movement of a crank arm of the first hoist draws the first wire grip in a direction toward the dead end connector of the power line, relieving tension so as to enable disconnection of the power line from the existing dead end connector. Through operation of the second hoist, the disconnected end of the power line then is moved into proximity for connection to the dead end connector on the new post, while it remains in a relaxed condition by the second hoist. After reconnection of the power line to the dead end connector on the new post, the second hoist is operated in a loosening direction, leaving the power line supported in the new dead end connector, whereupon both wire grips are then disconnected from the power line. Since the power lines typically are maintained in high tension, the handling of separate hoists by a workman high on the support post can be highly cumbersome, difficult, and dangerous.

OBJECTS AND SUMMARY OF THE INVENTION

It is an object of the present invention to provide a unitary hoist having a multiplicity of tensioning lines for moving the ends of power lines between different support locations.

Another object is to provide a unitary hoist as characterized above which may be more efficiently, easily, and safely used in transferring the ends of power lines between different support locations.

A further object is to provide such a hoist of the above kind which eliminates the need for a separate second hoist in the transfer of power lines between support locations.

Yet another object is to provide a hoist of the foregoing type that can be used in transferring power lines between support posts while utilizing a single wire grip.

Still a further object is to provide a method for more efficiently and safely transferring the ends of power lines from one support location to another.

Other objects and advantages of the invention will become apparent upon reading the following detailed description and upon reference to the drawings, in which:

Figure 1:
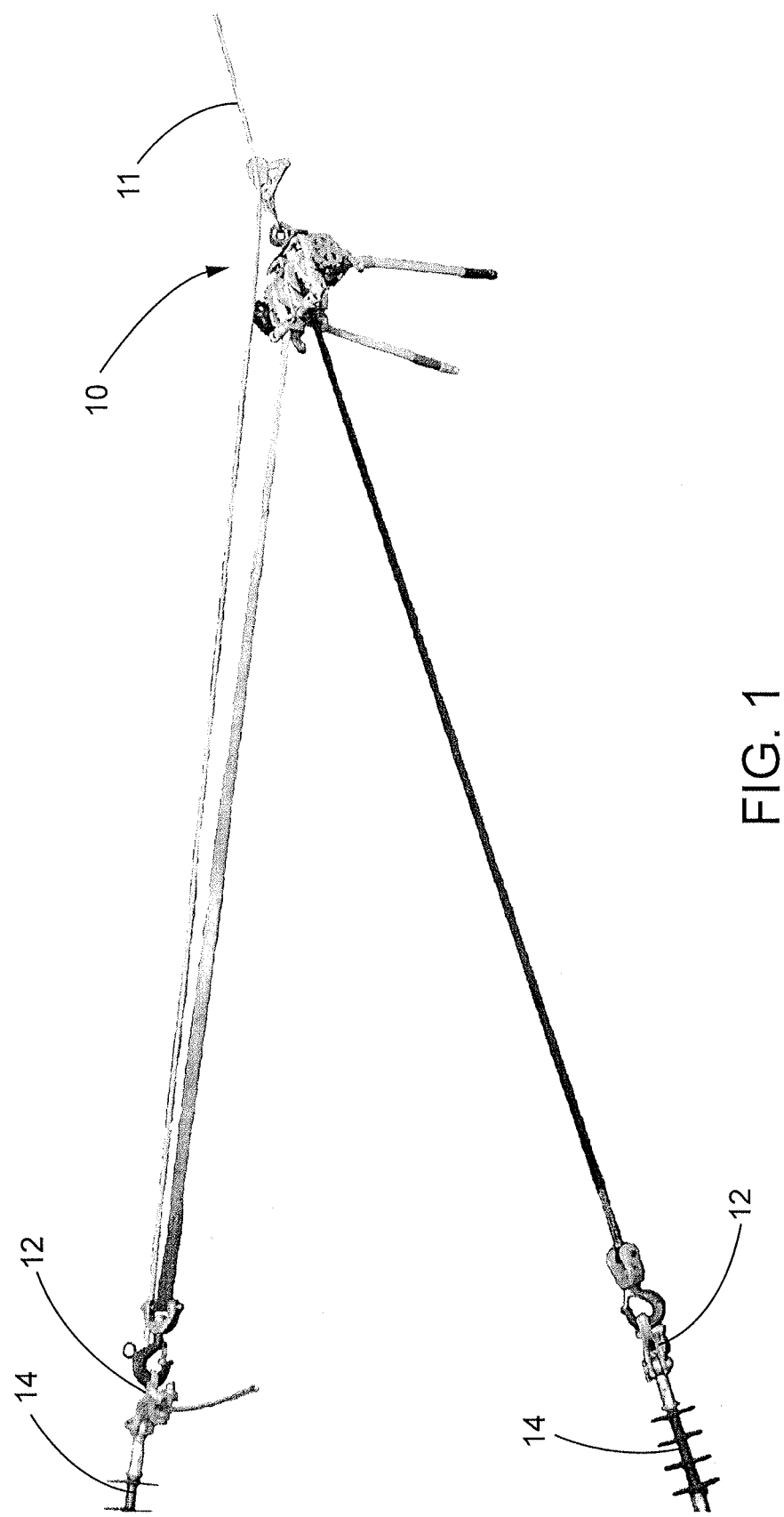
FIG. 1 is a perspective of an illustrated multiple action hoist in accordance with the present invention usable in the transfer the end of a power line from one support location to a new support location.
Figure 2:
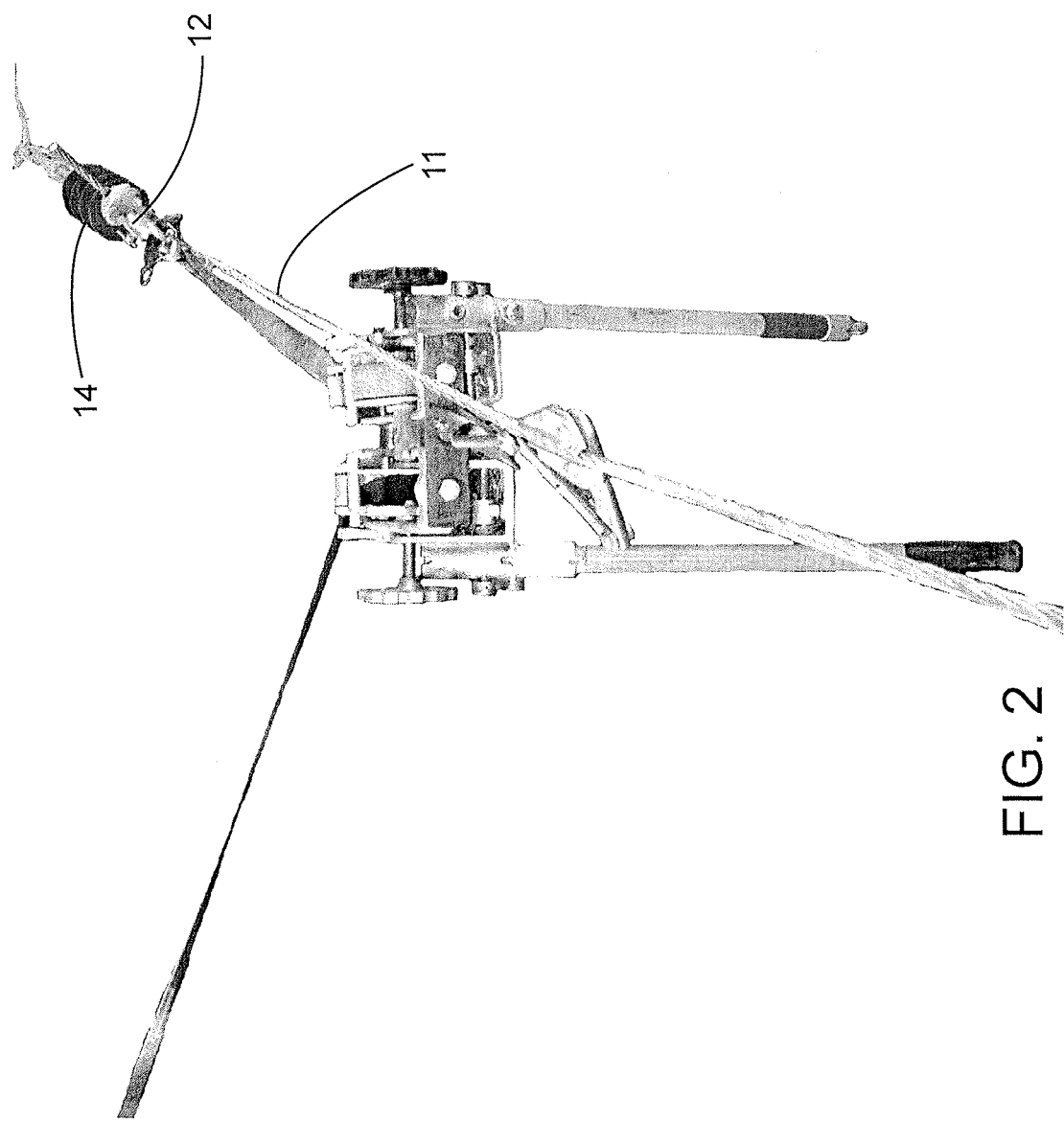
FIG. 2 is an enlarged perspective of the hoist shown in FIG. 1.
Figure 3:
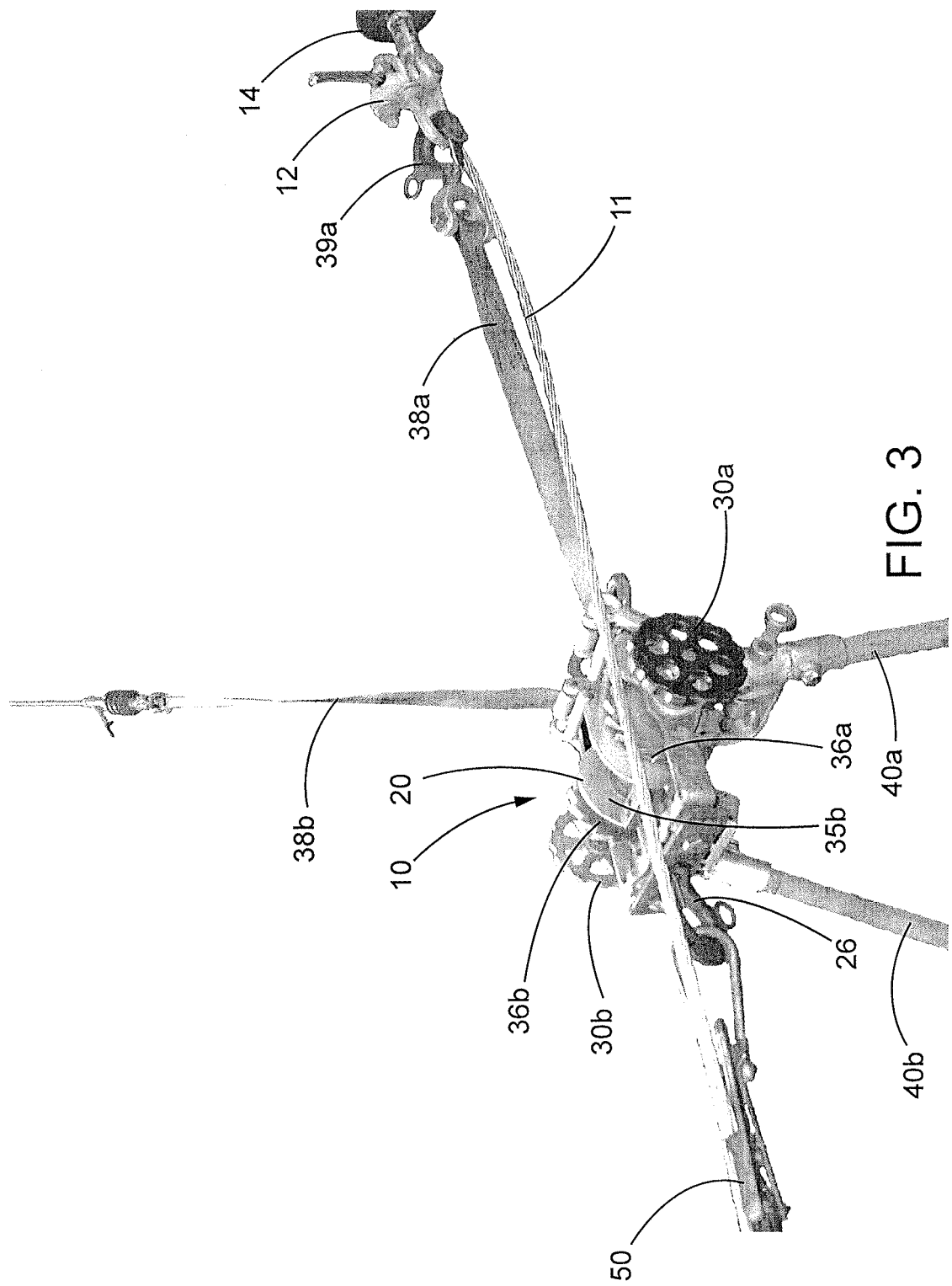
FIG. 3 is still a further enlarged perspective of the hoist shown in FIG. 1.
Figure 4:
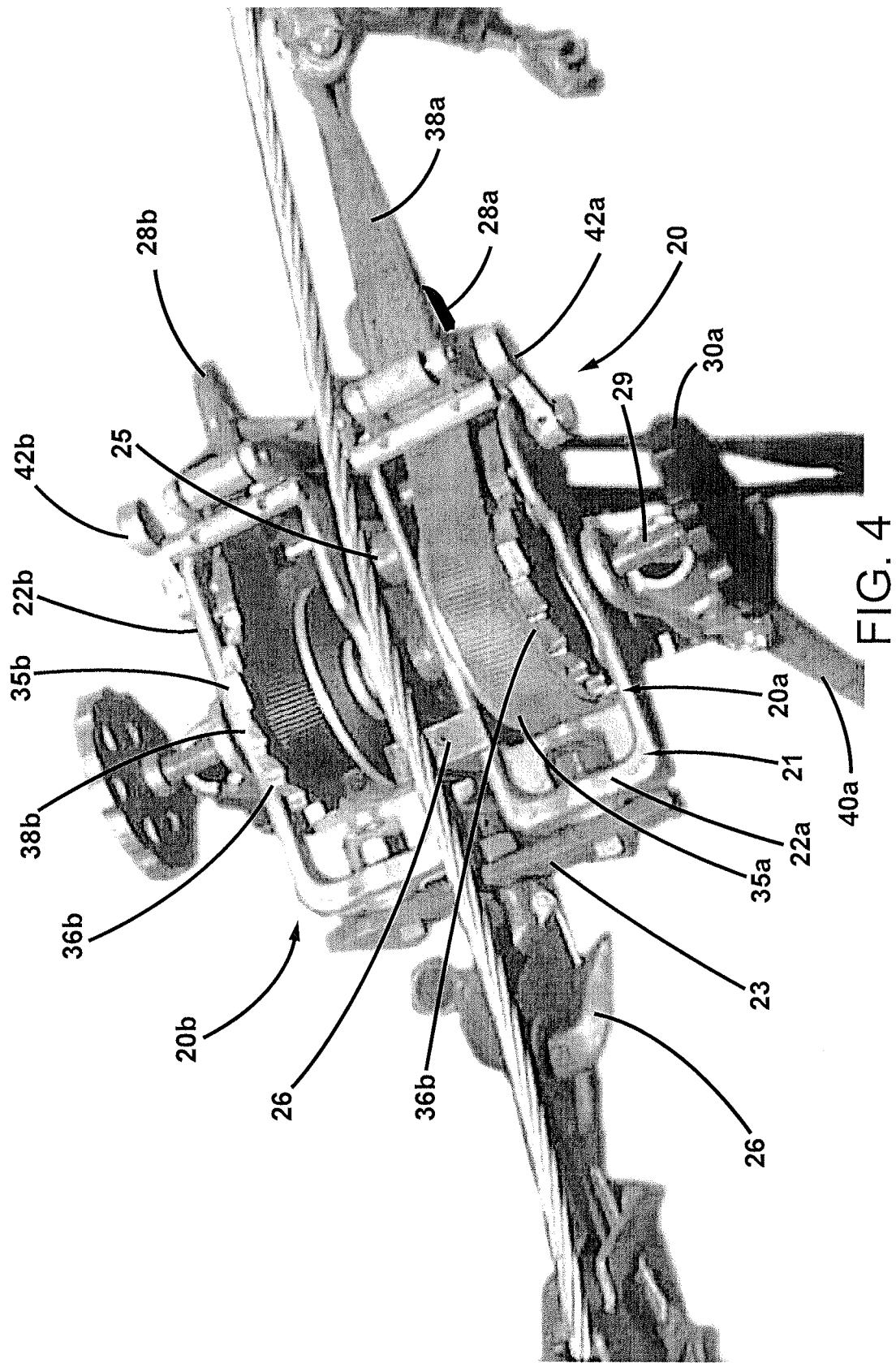
FIG. 4 is an enlarged underside perspective of the illustrated hoist.
Figure 5:
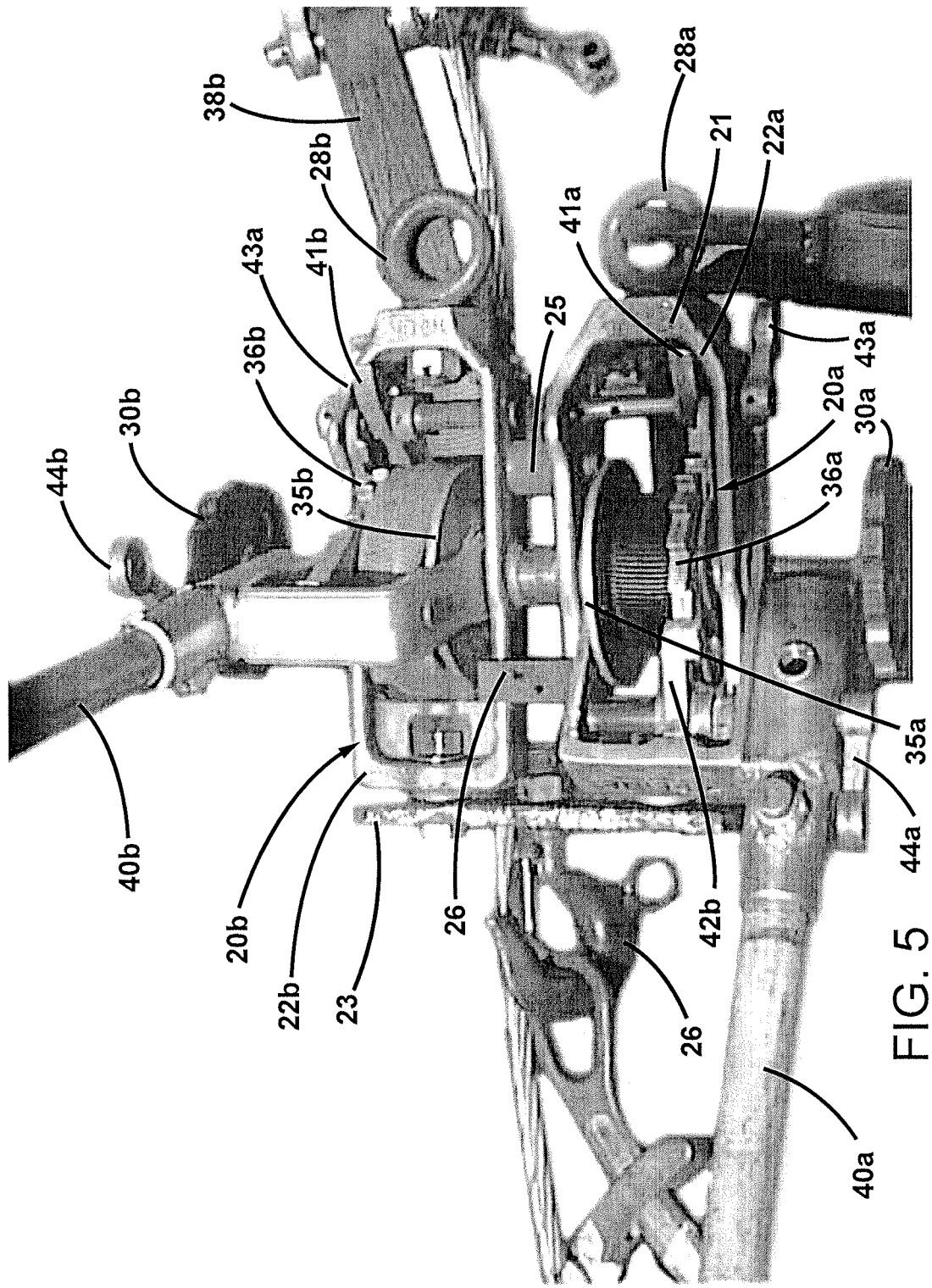
FIG. 5 is an top perspective of the illustrated hoist.
Figure 6:
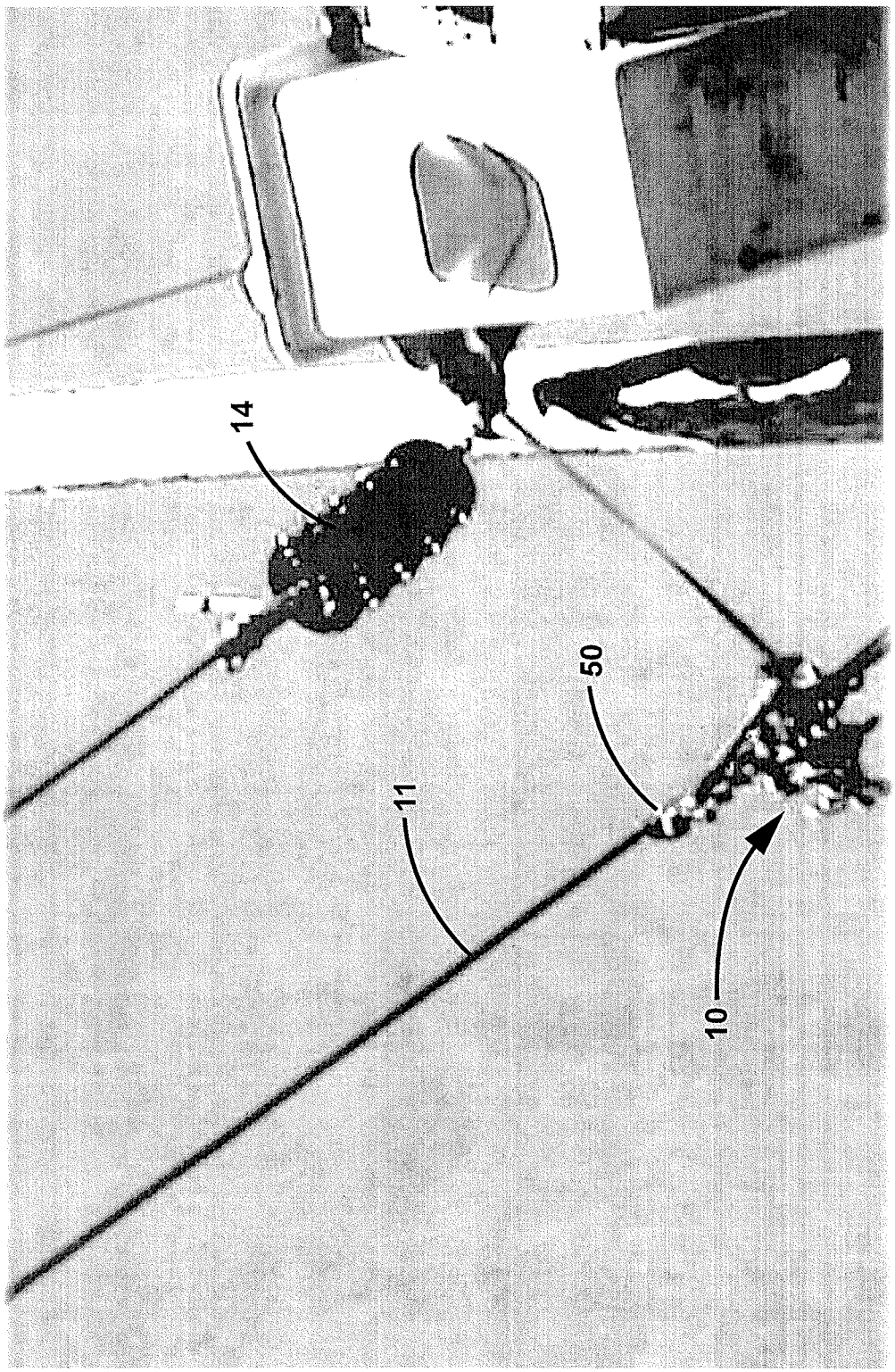
FIGS. 6-9 are depictions illustrating a method of disconnecting an end of a power line at an original support location.
Figure 7:
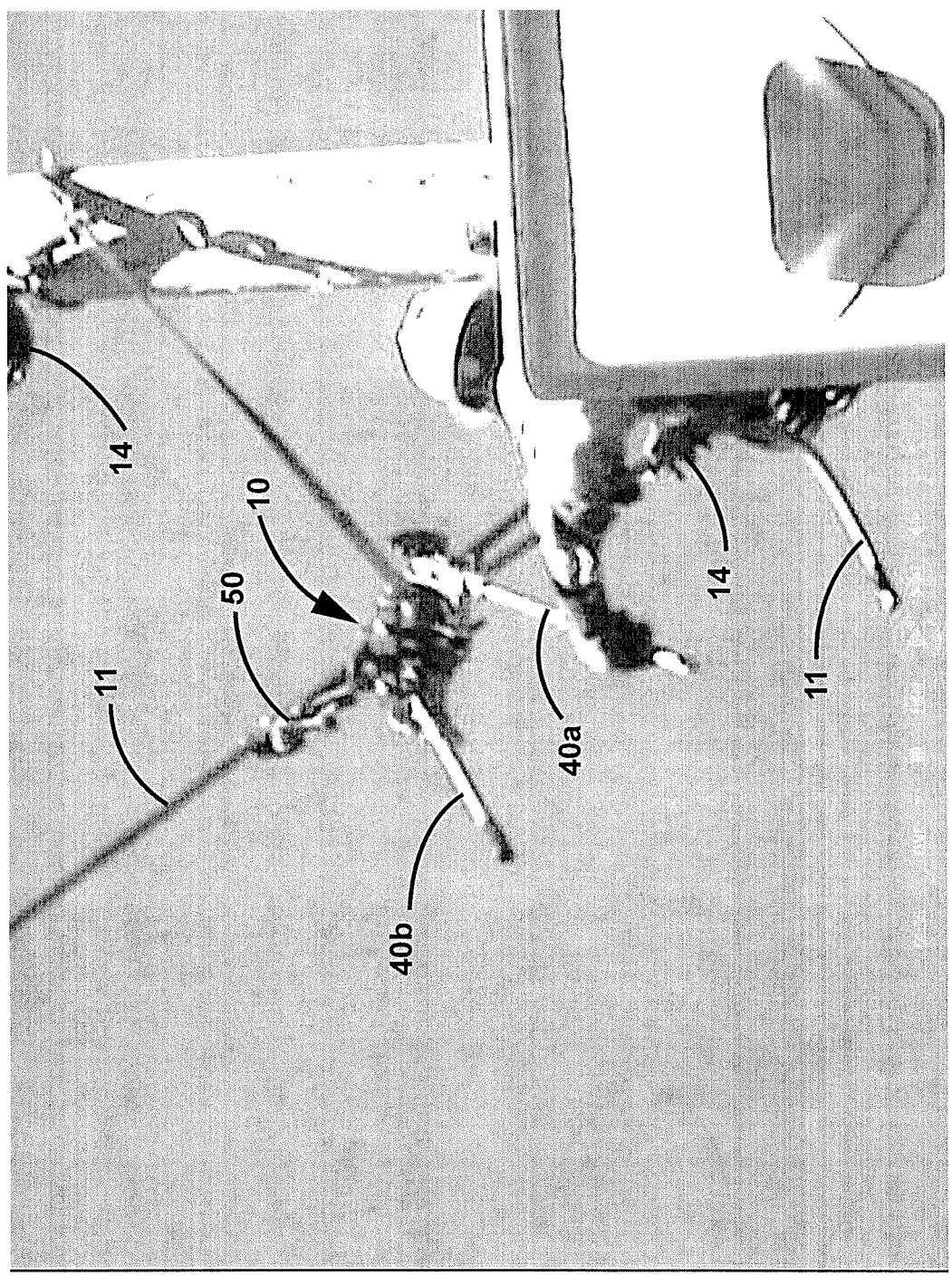
Figure 8:
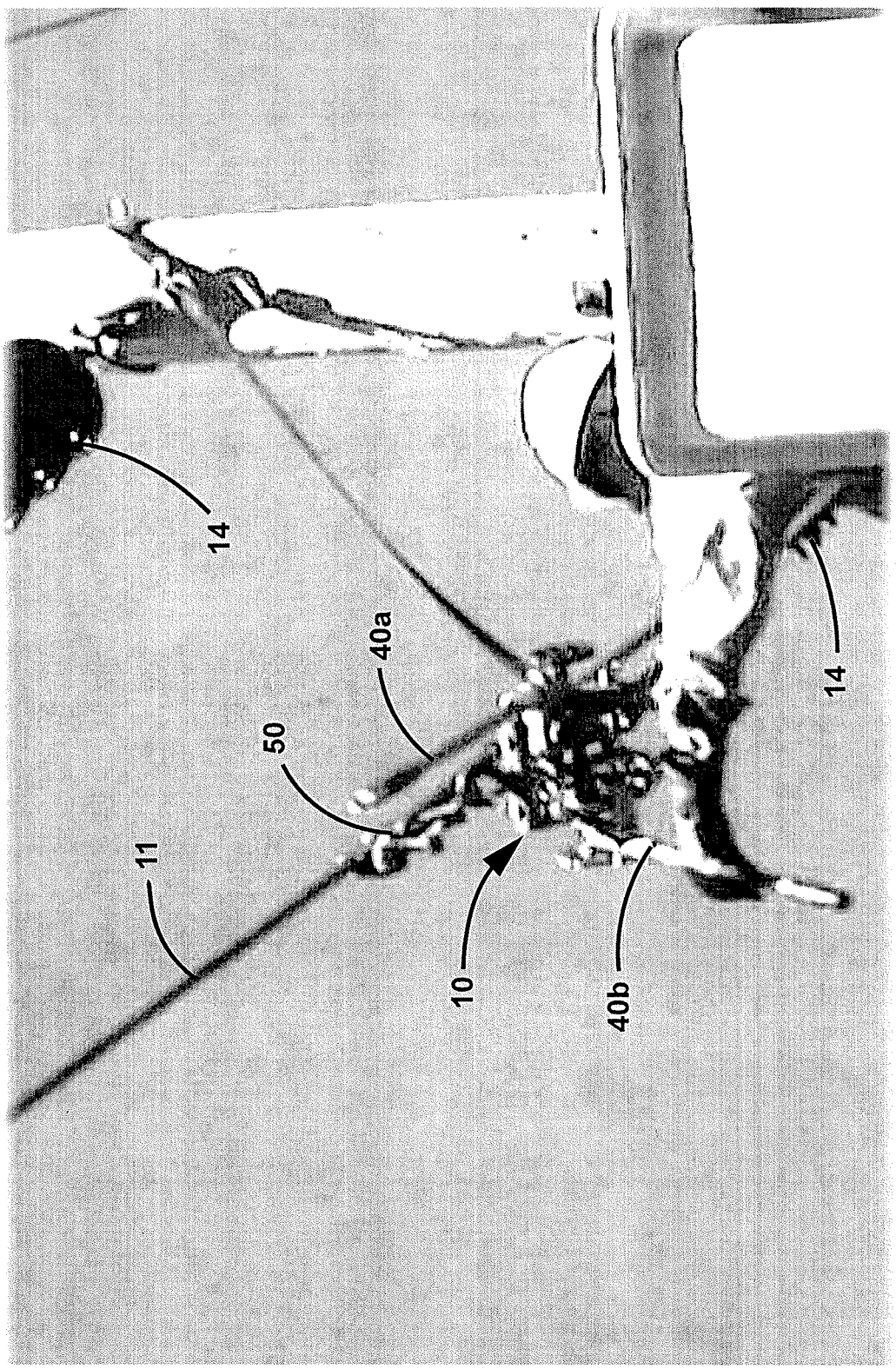
Figure 9:
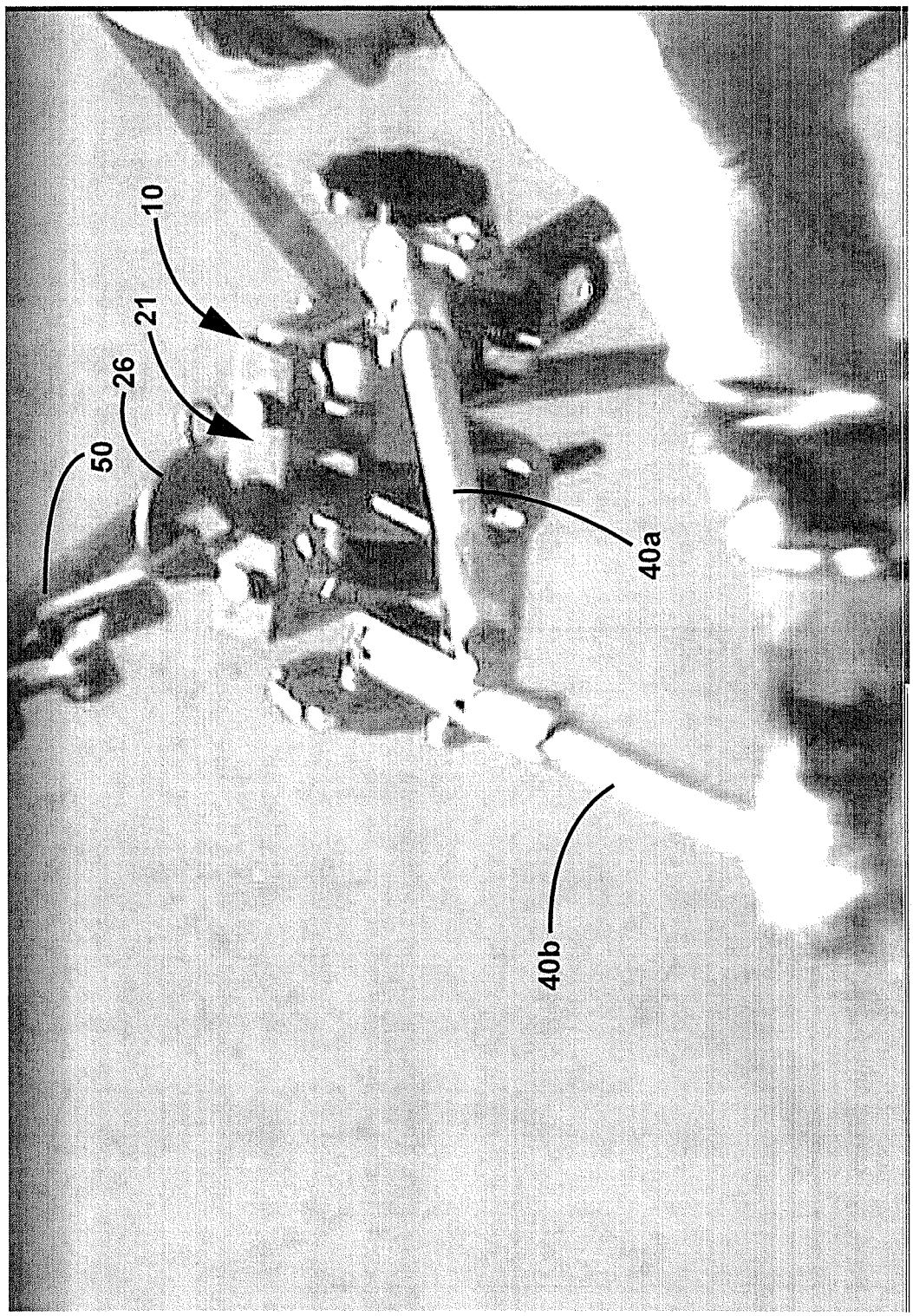

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative multiple action hoist 10 in accordance with the invention, which is effective for efficiently transferring the end of a power line 11 from one support post to second newly-installed post in relatively closely displaced relation to the original post, or from one support position on a support post to a different support position on the post either vertically or horizontally offset from the original position. As in known in the art, the end of the power line 11 commonly is connected to a support post, or a cross arm of the support post by a dead end connector 12 of a conventional type within which the terminal end of the power line 11 is clamped. The dead end connector 12 in turn is coupled to an insulator 14, again of a known type, which is coupled to the support post or cross arm thereof in a conventional manner, such as by a sister eye bolted to the cross arm.

For transferring the end of the power line from the dead end connector 12 on the original post to a dead end connector mounted on the new support post, heretofore the lineman typically uncouple the line from the existing dead end connector and secure it to a dead end connector mounted on the new post. As indicated above, this has required two hoists which must be individually operated by a lineman, which often can be difficult and cumbersome to operate by a lineman working at a high elevation above the ground.

In accordance with the invention, the hoist 10 has a unitary multi-action construction that is adapted for more efficient, safer, and easier transfer of a power line from an existing support to a new support post or support location. More particularly, the hoist 10 has a pair of independently operable hoist mechanisms 20a,20b adapted for easier operation in effecting the transfer of the end of a power line to a new support location. The hoist 10 in this case includes a frame 21 comprising a pair of hollow elongated hoist supports 22a,22b fixedly secured together by an end plate 23 bolted to a rear end of the hoist supports 22a,22b and side connectors 25,26 interconnecting adjacent sides of the hoist supports 22a,22b. An outwardly extending hook 27 is bolted to the connecting flange plate 23 and eyelets 28a,28b are secured in forwardly extending fashion to the opposite ends of the hoist supports 22a,22b, respectively. A central shaft 29 extends transversely through the frame supports with adjusting wheels 30a,30b fixed at opposite ends thereof.

In carrying out the invention, the hoist mechanisms 20a, 20b each have a respective tension line receiving drum 35a, 35b supported on the transverse shaft 29 with a ratchet wheel 36a,36b on a respective outer side thereof. The respective tensioning lines 38a,38b, which may be a strap, chain, cable, rope, or the like each have a hook 39a,39b at its outer end and is secured to the respective drum 35a,35b for winding and unwinding about the drum. Each hoisting mechanism 20a, 20b further includes a crank arm 40a,40b supported adjacent a respective outer side of each hoist support 22a,22b for pivotable movement about the shaft 29. The basic construction and operation of each of the hoist mechanisms 20a,20b may be of a conventional type, such as the Series 300A Lineman's hoist sold under the tradename Little Mule® by Columbus McKinnon Corporation. A dual pawl mechanism is provided comprising pawls 41a,41b and 42a,42b having respective levers 43a,43b and 44a,44b in a known type for controlling the direction of ratchet rotation, and hence, and drum rotation, as an incident to cranking movement of the arms 40a,40b. Adjustment of the levers 43a,43b and 44a,44b in one direction causes the ratchet wheels 36a,36b to move the drums 35a,35b in a direction for drawing the tension line 38a,38b into and about the respective drum, responsive to cranking movement of the arms 40a,40b and adjustment of the levers 43a,44a and adjustment in an opposite direction causes movement of the ratchet wheels 36a,36b and drums 35a,35b to rotate in a direction for unwinding the tensioning lines 38a,38b from the respective drums.

In use of the hoist 10 in accordance with the invention, when the end of the power line 11 is to be relocated from one support post, or cross arm thereof, to a closely adjacent new support post or cross arm, or from a different location on the same support post a wire clamp 50 is first positioned on the power line 11 a short distance from the end of the power line 11, and the hook 27 of the hoist is secured to a U-hook or eyelet 51 of the wire clamp 50. As in known in the art, pushing movement inwardly of the U-hook 51 of the wire clamp 50 opens the jaws of the wire grip for receiving the line, and movement of the U-hook 51 in an opposite direction, and under the pull of the hoist hook, secures the wire grip in engaging relation about the power line 11. The hook 39a of one of the tensioning straps 38a can be drawn out to a position for hooking onto an eyelet of the dead end connector 12, or alternatively, can be secured to the post at the original support position.

The hook 39b of the tensioning line 38b of the other hoist mechanism 22b can be secured to an eyelet of a dead end connector 12 pre-mounted, together with an insulator 14, at the new support position, either on the same support pole or on a different support pole. Again, alternatively, the tensioning line 38b can be secured to the support post at the new location. Using one of the crank arms 40a, the tensioning line 38a is drawn into about the drum 35a, drawing the wire clamp 50 and the end of the power line 11 into closer proximity to the original support for relieving the tension in the power line 11. At the same time, the crank arm 40b of the other hoist mechanism 22b may be operated to allow the tensioning line 38b of that hoist mechanism 22b to be drawn out as necessary, as depicted in FIGS. 6-9.

Figure 10:
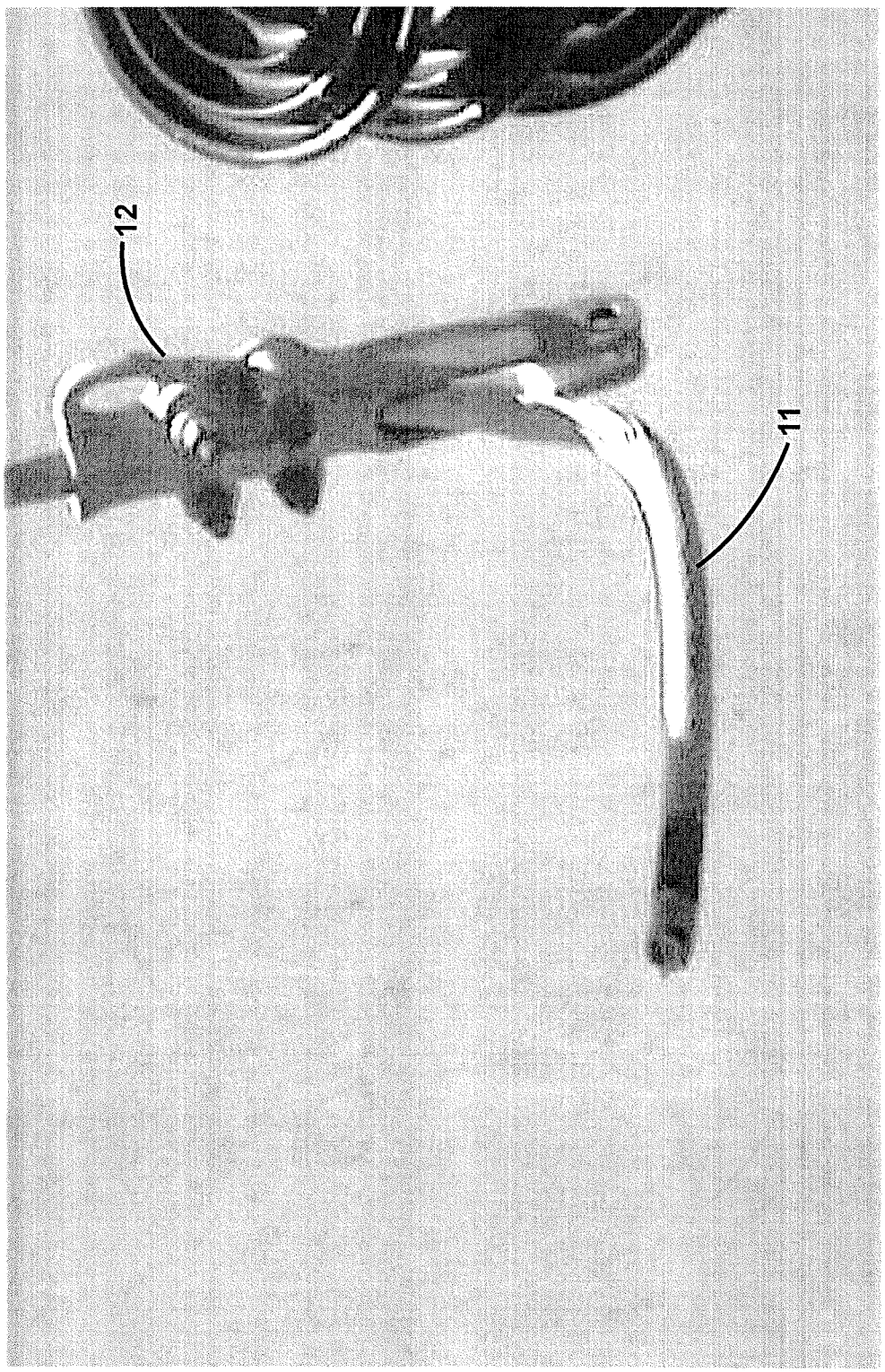
FIG. 10 depicts the end of the power line upon disconnection from the original support location.
Figure 11:
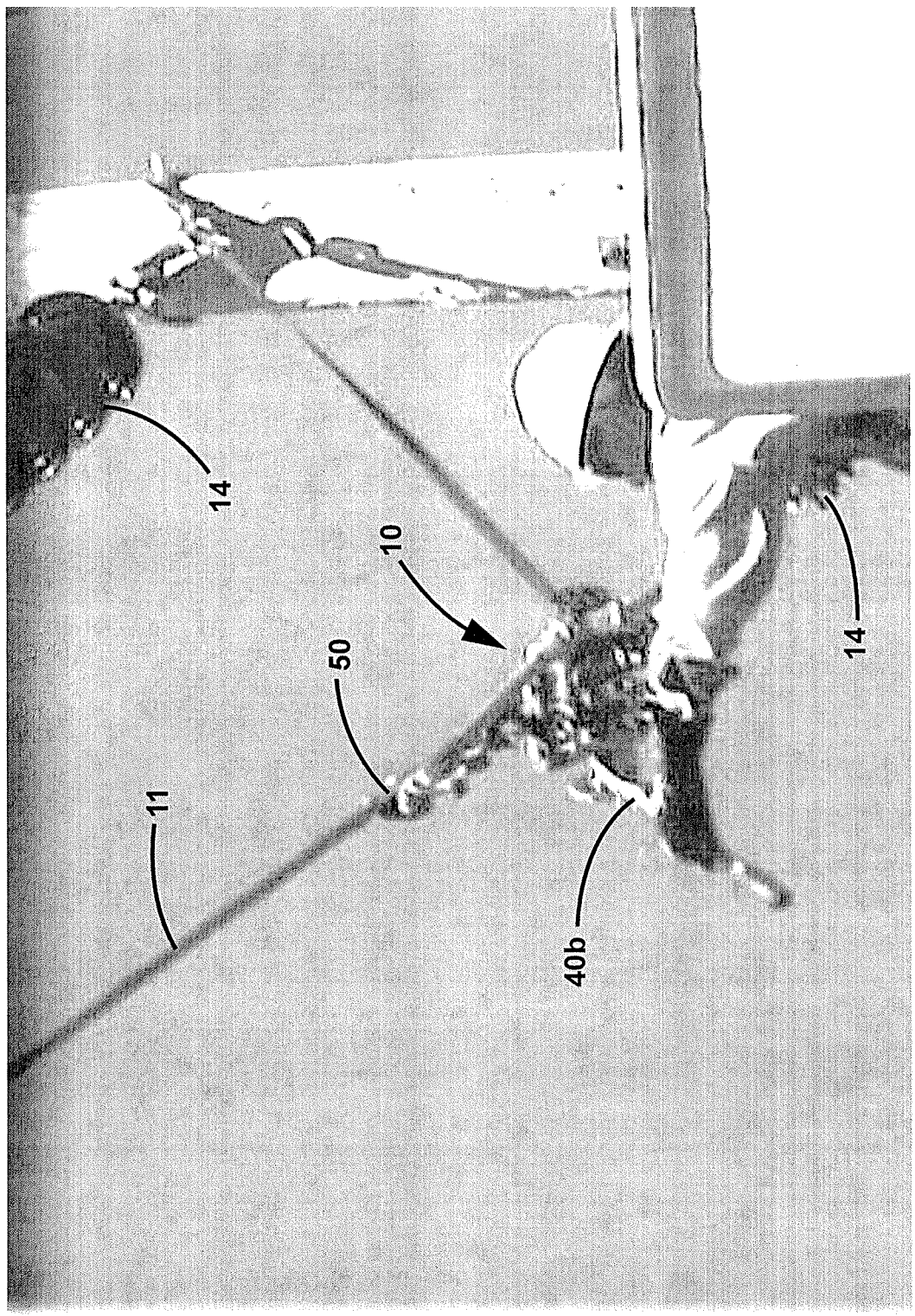
FIGS. 11 and 12 depict use of the hoist in moving the disconnected end of the power line to a new support location.
Figure 12:
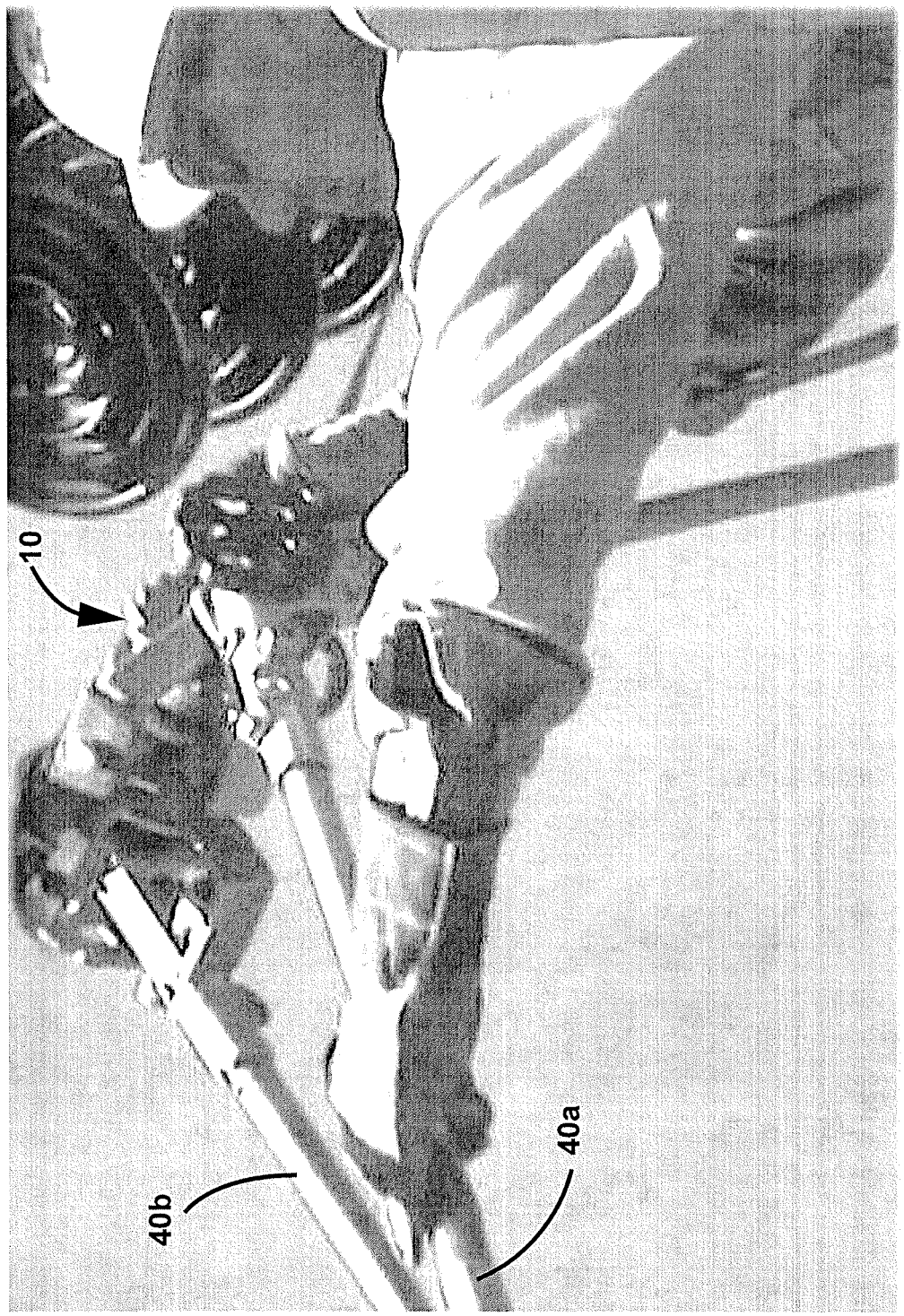

In the relieved condition, the power line 11 is disconnected from the original dead end connector 12, and upon operation of the crank arm 40b of the other hoist mechanism 22b, the drum 35b can be ratcheted in to draw the disconnected end of the power line 11 into close proximity to the new support location for enabling the end of the power line to be secured to the new dead end connector 12. In lieu of disconnecting the dead end connectors from the end of the power line 11, it will be understood that the dead end connector 12 may be disconnected from the original insulator 14 (See FIG. 10), and reconnected to the newly-installed insulator 14 at the new support position.

From the foregoing, it can be seen that a unitary multi-action hoist is provided which is adapted for easier, more efficient, and safe transfer of the ends of power lines between different support locations. The unitary hoist eliminates the necessity for cumbersome handling of separate hoists, and can be more simply used to transfer the ends of power lines with a single wire clamp. It will be understood that while the hoist has been described in connection with handling of the end of a single power line, it can also be used for simultaneously handling two power lines, such as in a downed condition or the like, with considerable time saving. Moreover, while the hoist has been shown for use in transferring and handling of power lines, it will be understood that the hoist would have additional uses which require synchronized handling and movement of a multiplicity of items.

The invention claimed is:

1. A hoist apparatus for transferring the ends of power lines between first and second supports at different locations comprising:
    a frame,
    a pair of independently operable hoist mechanisms supported by the frame,
    a first attachment element affixed to one end of the frame for enabling securement of the frame at a location adjacent the first support,
    said hoist mechanisms each including a respective tension line receiving drum rotatably supported by the frame and a tension line having an attachment element at one end and being coupled at its opposite end to the drum for winding and unwinding about the drum, said drums each having a respective ratchet mechanism for enabling selective ratcheted rotational movement of the drum for winding and unwinding the tension line from the drum such that one tension line may be secured to a power line to be removed from the first support and the attachment member of the other tension line may be simultaneously secured to a location adjacent the second support at the different location.

2. The hoist apparatus of claim 1 in which said drums are disposed for rotation about a concentric rotary axis.

3. The hoist apparatus of claim 2 in which said drums are supported on a common support shaft.

4. The hoist apparatus of claim 1 in which the first attachment element is a hook.

5. The hoist apparatus of claim 1 in which each attachment element affixed to the tension lines of the hoist mechanisms is a hook.

6. The hoist apparatus of claim 1 in which the ratchet mechanism of each drum includes a ratchet wheel affixed to a side of the drum, a pawl mechanism, and a crank arm.

7. The hoist apparatus of claim 1 including a pair of second attachment elements affixed to an end of the frame opposite the first attachment element.

8. The hoist apparatus of claim 7 in which said second attachment elements each is an eyelet.

9. A method of transferring the end of a power line between first and second supports at different locations using a hoist apparatus having a pair of independently operable hoist mechanisms supported by a common frame with an attachment element fixed to the frame a pair of independently operable hoist mechanisms supported by a common frame having an attachment element affixed to the frame and each hoist mechanism including a respective tension line with an attachment element at end which can be wound and unwound on a respective tension line receiving drum by a respective ratchet mechanism, comprising the steps of:

securing the frame fastening element to the power line adjacent the first support, securing the fastening element of the tension line of one of the hoist mechanisms at a location in close proximity to the first support, securing the fastening element of the other tension line in close proximity to the second support, unfastening the end of the power line from the first support, operating a hoist mechanisms to move the power line from the first support to the second support, and fastening the end of the power line at the second support.

10. The method of claim 9 in which the end of the power line is moved from the first support to the second support by unwinding the tension line from the first mechanism and winding the tension line in a windup direction in the second hoist mechanism.

11. The method of claim 9 including disconnecting the power line from a dead end connector at the first support, mounting a dead end connector at the second support, and connecting the end of the power line to the dead end connector at the second support.

* * * * *